Dec. 1, 1942.　　　　　　F. SHORT　　　　　2,303,664
HEAT EXCHANGE APPARATUS (CHIPICE-COMPACTOR)
Filed Sept. 23, 1940　　　　2 Sheets-Sheet 1

INVENTOR
*Frank Short*
BY
*Blair, Curtis & Hayward*
ATTORNEYS

Dec. 1, 1942.                    F. SHORT                    2,303,664
                  HEAT EXCHANGE APPARATUS (CHIPICE-COMPACTOR)
                  Filed Sept. 23, 1940              2 Sheets-Sheet 2
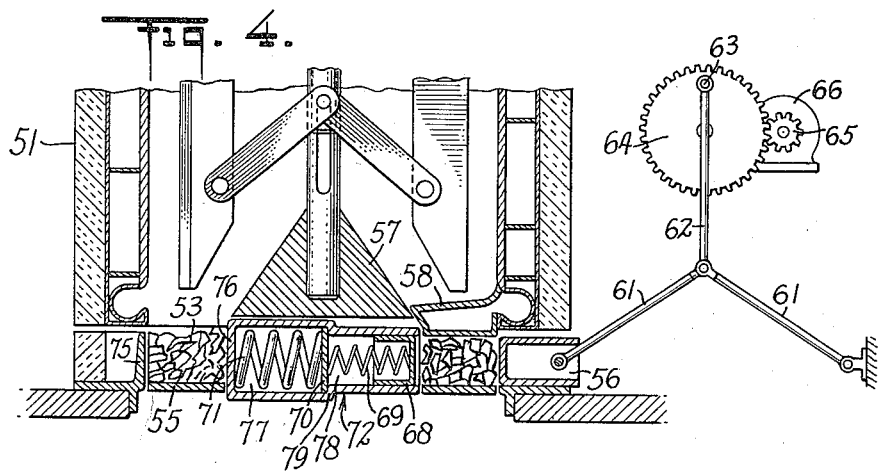
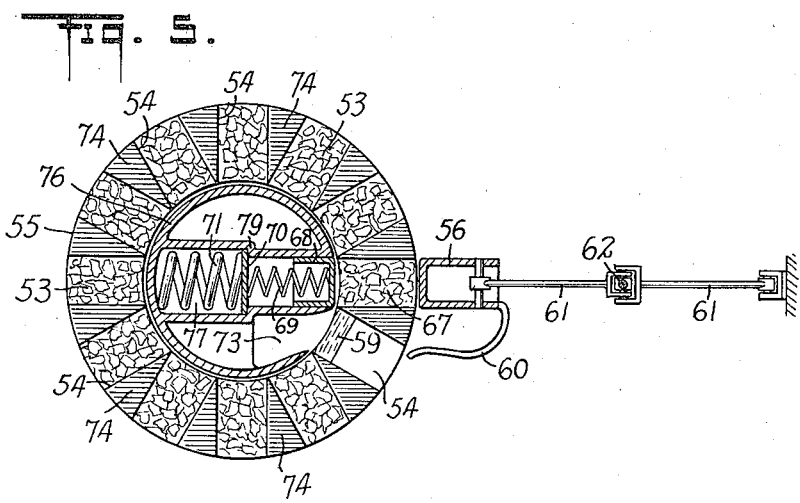
INVENTOR
*Frank Short*
BY
*Blair, Curtis & Hayward*
ATTORNEYS Patented Dec. 1, 1942

2,303,664

UNITED STATES PATENT OFFICE 2,303,664

HEAT EXCHANGE APPARATUS
(CHIPICE-COMPACTOR)

Frank Short, Canton Center, Conn., assignor to Flakice Corporation, a corporation of Delaware Application September 23, 1940, Serial No. 357,943

3 Claims. (Cl. 18—20)

This application is a continuation-in-part of my application Serial No. 187,761, filed January 29, 1938.

The embodiments of the invention hereinafter described are especially concerned with the manufacture of fragments or chips of congealed or frozen fluids. The fragments or chips may be compressed or compacted into larger units by the apparatus shown or used in their fragmentary form. Further, the machine described in the present embodiment is suitable for manufacturing fragments or chips of ice and compacting them into larger units. The term "ice" is used in its broader sense to include frozen liquids or liquid mixtures etc., such for example as fruit juices, creams and the like.

In the manufacture of edible products or substances which are to come in contact with edible products, cleanliness is an important consideration. One object of this invention, therefore, is to provide a refrigerating apparatus which may be easily and completely sterilized and which will minimize the possibility of foreign substances contaminating the product. Another object of this invention is to eliminate stuffing boxes in refrigerant lines, thereby reducing the leakage of refrigerant and, in some cases, the consequent deleterious physiological effects on the operator. Another object is to provide an apparatus which is suitable for either domestic or commercial use, and which may be easily and safely operated by anyone.

These and other objects which will be apparent or described may best be appreciated by reference to the accompanying drawings, in which:

Figure 4 is an axial sectional view of a compacter unit combined with a chipping machine such as shown in Figure 1; and Figure 5 is a top plan view of the compacter shown in Figure 4 (partly in section).

Figure 1:
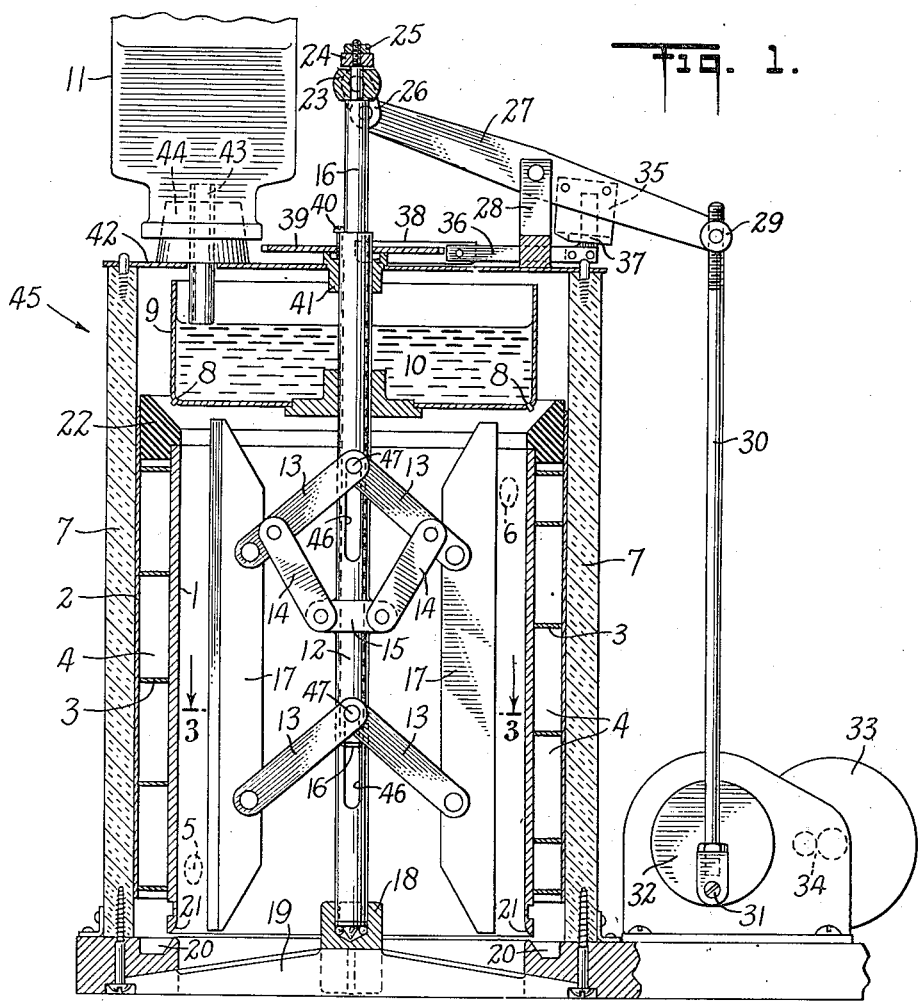
Figure 1 is an axial vertical sectional view of the chipping machine.

Referring to Figure 1, numeral 1 indicates a freezing surface which, in the illustrative embodiment here shown, is the internal surface of a cylindrical container, generally indicated at 45. The material used in constructing the freezing surface is selected in accordance with the characteristics of the liquid to be frozen and the corresponding ability of the surface to retain its high polish.

An outer wall 2 of the cylindrical container 45 forms with freezing surface 1 an annular space 4 for confining the refrigerant. The refrigerant is introduced into space 4 through inlet connection 5 (shown in dotted lines) and leaves through outlet connection 6 (also shown in dotted lines). A baffle 3 preferably of helical form directs the flow of refrigerant in space 4 to refrigerate the surface substantially uniformly. Either a primary refrigerant such as ammonia or a secondary refrigerant such as brine may be used. Suitable insulation 7 is applied to the outside of cylindrical container 45.

Figure 2:
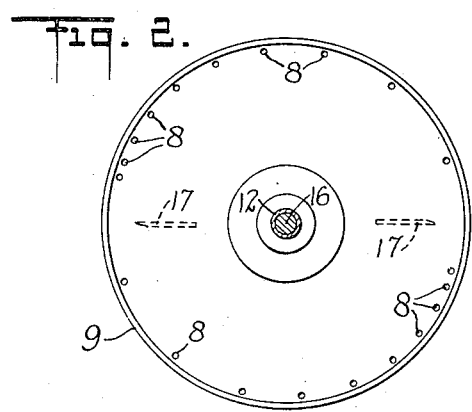
Figure 2 is a top plan view of the water cup, showing certain associated parts in section.

The water or other fluid to be congealed or frozen flows from water cup 9 through nozzles 8. (See Figure 2.) Preferably the nozzles should be arranged so that no liquid flows onto freezing surface 1 in the region just preceding, at, and following chipping blades 17. It is also desirable that the nozzles be progressively spaced so that more liquid will flow onto the bare freezing surface just after chipping than further along where there is an insulating layer of ice to slow up the freezing rate. The water or other liquid to be frozen is indicated at 10. It may be fed at just the proper rate to be frozen, producing a white or cloudy solid, or it may be flushed over the surface to produce a clear solid, and the excess directed into drip channel 20 by outwardly curved portion 21 near the bottom of the freezing surface. The liquid flowing into channel 20 may be recirculated by a pump (not shown).

One method of adding liquid to water cup 9 is illustrated at 11. A container containing the liquid to be frozen is fitted with a rubber stopper 44 having a tube 43 extending therethrough. The container is inverted and supported on the cover plate 42 of the cylindrical container 45. The tube 43 extends down into water cup 9 to the point where the liquid level is to be maintained. Liquid will flow from the container into water cup 9 only when the lower end of the tube is exposed. Such a method of feed is suitable for use with small scale apparatus. With large scale apparatus other well-known methods of maintaining constant liquid level may be used.

Figure 3:
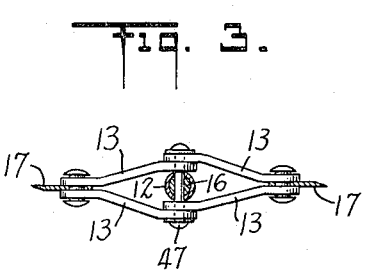
Figure 3 is a sectional view of the chipping blades and turning tube taken on line 3—3 of Figure 1.

The frozen solids are removed from the freezing surface by the chipping blades 17. The chipping blades are preferably provided with chisel edges (see Figure 3) so that entering the edge into the ice layer on the freezing surface 1 produces a strong lateral push to remove a narrow chip. In fact, the lateral push will be several times as great as the radial force of the chipping blades 17 on account of the wedge action. The chipping blades 17 are supported by links 14 which are in turn supported by a bar 15 connected to a turning tube 12. Turning tube 12, which also supports water cup 9, is itself supported by a step bearing 18 and held in place by a second bearing 41 in the cover plate 42. A spider 19 rigidly supported by the base of cylindrical container 45 supports the step bearing 18. The spider 19 is designed to interfere as little as possible with the fall of chips after they have been wedged from freezing surface 1. The chipping blades 17 are periodically wedged into the sheet of ice by pressure links 13 actuated by operating rod 16. The wedging action of blades 17, in combination with the toggle action of the pressure links 13, will call for only a small force on the operating rod 16, hence low total power consumption.

Operating rod 16 is coaxial with turning tube 12 and extends downwardly therethrough. It is connected to pressure link 13 by pin 47 which moves in slots 46 of the turning tube 12. The operating rod 16 is given a reciprocating motion by a walking beam 27 supported by beam pivot 28. Walking beam 27 is connected to operating rod 16 by means of a beam link 26 and a cross head 23 which is rotatably mounted on rod 16. Cross head 23 is held in place by a shoulder of rod 16 and by a stop 24 and lock nut 25. The power for operating walking beam 27 is supplied by a motor 33 which, through reducing gear 34, turns crank pin disk 32. A connecting rod 30 connects walking beam 27 at cross pin 29 to crank pin disk 32 at crank pin 31.

To avoid the possible building of a mass of ice at the top of the freezing surface, which might interfere with proper distribution of liquid from nozzle 8, an insulating flexible rim 22 is provided on to which the liquid first falls. Ice if formed on this at times will readily be chipped off as the chipping blades extend upward for that purpose.

Rotary motion is imparted to the chipping mechanism by a pawl and ratchet device. A ratchet wheel 39 is non-rotatably mounted upon turning tube 12 and held in place by lock pin 40. The pawl actuator 35, connected to walking beam 27, connects with a pawl finger 37 of pawl rod 36 and causes a pawl spring 38 to engage and push one of the teeth of ratchet drive 39, driving turning tube 12 through lock pin 40.

This drive occurs on the up-stroke of operating rod 16 after the chipping operation. Thus, the chipping blades 17 are moved to position for the next chip removal, and are assured of a substantially radial action.

In operation, the chipping mechanism is rotated in a step-wise manner to move the respective chipping blades slightly over the edge portions of the ice sheet that has been formed over the freezing surface. Then the operating rod 16 causes chipping blades 17 to be pressed against the ice sheet near its edges. A slow wedging action is obtained by the radial movement of the blades, giving time for the shear action to remove the edge portions from the sheet and freezing surface, in the form of frozen chips.

Referring to Figures 4 and 5, the chips 53 from the chip making machine 51 are allowed to fall on a rotatable pocket table 55. Pocket table 55 is in the form of an annular ring and supports a series of pockets or compartments 54 formed by wedge-shaped member 74. A baffle 57 may be placed in the bottom of the chipping machine 51 to direct the flow of chips into the pockets 54. A stationary wall 75 at the outer periphery of the pocket table 55 and a second stationary wall 76 at the inner periphery of the pocket table serve to retain the chips in the pockets 54. In this embodiment the thrust bearing may be replaced by a suitable thrust bearing at the top of the shaft 12 as, for example, by making the bearing 41 (Figure 1) a thrust bearing in a known manner.

A pressure chamber 72 is provided within the wall 76. The pressure chamber 72 is divided into two compartments 77 and 78. In compartment 77 a heavy spring 71 is held in compression by a plate 70. Compartment 77 is slightly larger than compartment 78, thus forming a shoulder 79 which serves to retain plate 70. Compartment 78 is provided with a light spring 69 abutting at one end plate 70 and at the other end a piston or plunger 68. When springs 71 and 69 are expanded, the plunger 68 abuts the inner periphery of pocket table 55.

At the outer periphery of pocket table 55 and opposite plunger 68, a second plunger 56 is provided. Plunger 56 is operated by suitable mechanism to give it the necessary travel and force, preferably by a toggle action more or less diagrammatically shown in Figures 4 and 5 wherein motion is imparted to plunger 56 by means of toggle links 61 and connecting rod 62. Connecting rod 62 is connected to crank pin 63 on crank disk 64 driven by motor 66 through pinion 65.

On the down-stroke of connecting rod 62, plunger 56 is forced through one of the pockets 54 in alignment therewith and with plunger 68 and its associated parts, into compartment 78, thereby forcing the charge of chips against plunger 68. Spring 69 offers little resistance and plunger 68 recedes until it hits plate 70. The heavy compression of spring 71 tends to resist further motion of plunger 68 and the charge of chips 67 is compacted into a mass or briquette 59.

On the return stroke of plunger 56, plate 70 holds back the heavy pressure of spring 71, allowing the light spring 69 to push the briquette 59 back into the empty pocket 54. The spring 69 may be attached at its ends to the end plate 70 and to the plunger 68 so that in its expanded position it prevents the plunger 68 from leaving the chamber 72. When the plunger 56 is clear of pocket 54, the pocket table 55 is rotated one pocket in a clockwise direction as viewed in Figure 5 by a mechanism (not shown). A fresh charge of chips is thus moved in front of compression chamber 72. On the next stroke, the stripper 60 pushes the briquette 59 out of the pocket and allows it to fall through aperture 73 into a storage bin below (not shown).

A lid 58 is provided to keep chips from falling into the two pockets which are operated on by plunger 56 and stripper 60.

Considering the apparatus as a whole, it will be evident that it is simple and durable in construction. Since it is easily and completely insulated and requires only a small amount of power for its operation, the operating cost is low. The construction is such that the refrigerating surface and the blades may be readily sterilized with steam or boiling water. The refrigerating surface is enclosed and thus kept free from dust or other contaminating substances. It will thus be seen that this invention comprises an art and an apparatus both of an essentially practical nature in which the several objects referred to above are attained.

As the art herein described may be carried out in various ways and as the apparatus may be materially changed without departing from the scope of the invention, it is to be understood that all matter herein set forth or shown in the accompanying drawings is to be interpreted as illustrative and not in a limiting sense.

I claim:

1. In apparatus for compacting fragments of a congealed fluid, in combination, rotatable means including a ring of compartments for confining said fragments, a compression chamber, means for forcing said fragments into said chamber, means for applying pressure to said fragments in said chamber to form a briquette, and means for removing said briquette from said chamber.

2. In apparatus for compacting fragments of a congealed fluid, in combination, rotatable means including a ring of compartments for confining said fragments, a compression chamber, means for forcing said fragments into said chamber and for applying pressure to said fragments to form a briquette, spring means for returning said briquette to one of said compartments, and means for removing said briquette from said compartment.

3. In apparatus for compacting fragments of a congealed fluid, in combination, rotatable means including an annular ring of compartments for collecting and confining said fragments, a compression chamber within the said ring, means external to the said ring including a plunger to force the said fragments from one of the said compartments into the said compression chamber, the said plunger, compartment and compression chamber being in alignment at the time, spring means for exerting a pressure on the said fragments to form them into a briquette, means for returning the said briquette to the said compartment, means for ejecting said briquette from said compartment, and means for rotating said annular ring to move a fresh charge of fragments in front of said plunger.

FRANK SHORT.